Patented Dec. 29, 1936

2,066,119

UNITED STATES PATENT OFFICE 2,066,119

MANUFACTURE OF NAPHTHAZARINE DYESTUFFS

Carl Mettler, Basel, Switzerland, assignor to the firm J. R. Geigy A. G., Basel, Switzerland No Drawing. Application October 30, 1934, Serial No. 750,710

5 Claims. (Cl. 260—56)

In the specification of U. S. Patent No. 647,370, granted April 10, 1900, the production of green coloring-matters is described, obtained by treating the body known as "naphthazarine intermediate product", preferably in pure crystallized form, with aromatic amines, with or without the use of a condensing agent or solvent. The coloring-matters are first obtained in a form insoluble in water; but can be readily sulphonated to soluble sulpho acids, which dye unmordanted wool from the acid-bath, giving beautiful green shades.

The chemical constitution of the above mentioned "naphthazarine intermediate product", formerly not definitely ascertained, and described and known for a long time under this name only both in patents and in general scientific literature, has been found to be 8-amino-5-hydroxy-naphthoquinone-(1,4)-imide-(4) of the following formula:—

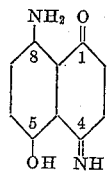

(see Beilstein, fourth edition, XIV, page 264).

The constitution of the insoluble green dyestuff intermediate products obtained by treating the above aminohydroxynaphthoquinoneimide with aromatic amines is not quite ascertained but they must be higher arylated naphthoquinoneimide-derivatives.

The amines employed in specification No. 647,370 are aniline, o- and p-toluidine, p-phenylendiamine, benzidine and the like.

It has been found that the very rapid and easily effected production of dyestuff takes place by a reaction occurring in stages and that the simple condensation products formed between amino-phenol ethers and the above named aminohydroxynaphthoquinoneimide are new valuable colored compounds which can be used for dyeing cellulose derivatives by usual methods. While the direct reaction products according to specification No. 647,370 are insoluble green dyestuff intermediates, which after sulphonation yield water-soluble green wool dyestuffs, the products produced by the present invention are blue and greenish-blue compounds, according to the amine used and the conditions of the reaction.

In order to moderate the reaction, that is to prevent its proceeding too rapidly and too far, only mild reaction conditions are preferably employed; it has been found best to effect the reaction at relatively low temperatures, for example around 70–90° C., or to make the reaction time short, say only a few hours, or finally to slow down and moderate the reaction by the addition of solvents and diluents. The condensation is interrupted at the point when the desired pure tone is reached, as is easily determined by taking samples at frequent intervals.

The naphthazarine intermediate product itself, which can easily be prepared in accordance with the particulars given in the literature or prior patents, for example from 1,5-dinitronaphthalene and sulphur sesquioxide, is a body easily soluble in water with a beautiful blue color. But it cannot be used as a dyestuff for acetate silk because the water resistance of the color is very poor.

It has already been attempted to produce colored compounds from the naphthazarine group, as described for example in U. S. specification 1,759,273. By the action of primary, aliphatic amines upon naphthazarine under mild conditions, not vat-dyestuffs but blue to blue-green colored substances are obtained which are proposed for dyeing acetate silk. Such dyestuffs however have very limited fastness to light.

Other naphthazarine condensation products produced as described for example in British specification 327,860 from naphthazarine and ammonia, are substances insoluble in water, which are soluble in organic solvents with dark colors of brown and grey shades. The action of aromatic amines, such as aniline, upon naphthazarine yields useless bodies, which dye cellulose derivatives Bordeaux shades which are not proof to light.

In contradistinction the condensation products according to the present invention have much more valuable dyeing properties. They dye cellulose derivatives vivid blue to blue green shades having good resistance to washing and water, they can be discharged white in light shades, and are adapted in small percentages to increase the light resistance of other acetate silk dyestuffs.

The following examples will serve further to illustrate the invention and the manner in which it is carried into effect and some of the new dyestuffs obtained.

Example 1

19 kg. of naphthazarine intermediate product as can be obtained according to British specification 16,295 of 1899 and having the form of pressed cakes are stirred with 200 kg. of 80% acetic acid with the addition of 14 kg. of sodium acetate and 14 kg. of p-phenetidine and slowly heated. The temperature is kept at 90° C. until the colour of the blue-violet solution has become pure blue-green and the intensity of color ceases to increase. By taking samples and comparing the shade in an organic solvent such as alcohol or aniline, or by dyeing acetate silk with the samples, it is easily determined when the optimum has been reached. Heating should not be continued any longer as higher condensed products are formed which cannot be used for dyeing acetate silk. The liquid is then quickly poured into cold water and a small quantity of the unchanged naphthazarine intermediate product is washed out with warm water until the latter no longer runs out with a reddish blue colour, and drying is then effected.

If an equal quantity of p-anisidine is used in place of p-phenetidine, a dyestuff with similar properties is obtained.

Example 2

19 kg. of naphthazarine intermediate product are boiled under reflux with 20 kg. of p-aminophenoloxethylether and 200 kg. of spirit, with the addition of 14 kg. of sodium acetate, for 20 hours, then poured into water with a little acid, the liquor drawn off and washing effected with water at 60° C. until this runs off colorless.

What I claim is:—

1. A blue to greenish blue coloring-matter prepared by moderated interaction of 8-amino-5-hydroxy-naphthoquinone-(1,4)-imide-(4) and a p-amino-phenol-ether selected from the group consisting of p-phenetidine, p-anisidine and p-amino-phenol-hydroxyethyl-ether, said coloring matter being directly usable for dyeing cellulose derivatives and being insoluble in water and dilute acids and alkalies, and soluble in sulphuric acid, glacial acetic acid and aromatic amines.

2. A method of preparing a dyestuff particularly suitable for dyeing acetate silk, which consists in causing the 8-amino-5-hydroxy-naphthoquinone-(1,4)-imide-(4) to interact under mild conditions with a p-amino-phenol-ether selected from the group consisting of p-phenetidine, p-anisidine and p-amino-phenol-hydroxyethylether, the reaction being stopped when a pure greenish blue shade is reached.

3. A method of preparing a dyestuff, which consists in mixing about 19 parts of 8-amino-5-hydroxy-naphthoquinone-(1,4)-imide-(4) with about 200 parts of acetic acid of 80 per cent strength with the addition of sodium acetate, and about 14 parts of p-phenetidine, slowly heating the mixture to about 90° C., maintaining the temperature until the color of the solution becomes pure blue-green and the intensity of color ceases to increase, pouring the liquid quickly into cold water, and removing unchanged quinoneimide by means of warm water.

4. A method of preparing a dyestuff, which consists in mixing about 19 parts of 8-amino-5-hydroxy-naphthoquinone-(1,4)-imide-(4) with about 200 parts of acetic acid of 80 per cent strength with the addition of sodium acetate, and about 14 parts of p-anisidine, slowly heating the mixture to about 90° C., maintaining the temperature until the color of the solution becomes pure blue-green and the intensity of color ceases to increase, pouring the liquid quickly into cold water, and removing unchanged quinoneimide by means of warm water.

5. A method of preparing a dyestuff, which consists in boiling 8-amino-5-hydroxy-naphthoquinone-(1,4)-imide-(4) with about an equal quantity of p-amino-phenol-($\beta$-hydroxy-ethyl)-ether and about ten times as much spirit for about 20 hours, pouring the mixture into acidified water, drawing off the liquid and washing with water at 60° C.

CARL METTLER.